(12) United States Patent
Kato et al.

(10) Patent No.: US 10,592,014 B2
(45) Date of Patent: Mar. 17, 2020

(54) DISPLAY CONTROL SYSTEM, METHOD, AND PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Hiroyasu Kato, Nishio (JP); Kazuhiro Kamiya, Okazaki (JP); Seiichi Tanaka, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/529,252

(22) PCT Filed: Dec. 22, 2015

(86) PCT No.: PCT/JP2015/085762
§ 371 (c)(1),
(2) Date: May 24, 2017

(87) PCT Pub. No.: WO2016/104469
PCT Pub. Date: Jun. 30, 2016

(65) Prior Publication Data
US 2017/0262082 A1 Sep. 14, 2017

(30) Foreign Application Priority Data

Dec. 25, 2014 (JP) .................................. 2014-261972

(51) Int. Cl.
*G06F 3/038* (2013.01)
*G06F 3/0481* (2013.01)
(Continued)

(52) U.S. Cl.
CPC ............ *G06F 3/0386* (2013.01); *B60K 35/00* (2013.01); *B60K 37/06* (2013.01);
(Continued)

(58) Field of Classification Search
CPC ...... G06F 3/038; G06F 3/0481; G06F 3/0386; G06F 3/03542; G06F 3/04817; G06F 3/0354
See application file for complete search history.

(56) References Cited

U.S. PATENT DOCUMENTS

| 2005/0099387 A1 | 5/2005 | Matsumoto et al. |
| 2005/0099388 A1 | 5/2005 | Matsumoto |

(Continued)

FOREIGN PATENT DOCUMENTS

| EP | 2 725 475 A2 | 4/2014 |
| JP | H08-314637 A | 11/1996 |

(Continued)

OTHER PUBLICATIONS

Feb. 9, 2016 Search Report issued in International Patent Application No. PCT/JP2015/085762.
(Continued)

*Primary Examiner* — Md Saiful A Siddiqui
(74) *Attorney, Agent, or Firm* — Oliff PLC

(57) ABSTRACT

Display control systems, methods, and programs obtain an indicated location indicated by a pointer, based on an output from a pointing device, and display, on a display, a user interface screen that displays icons at predetermined locations and displays the pointer indicating the indicated location. The systems methods, and programs draw, when the indicated location is present in a draw-in region including one of the icons, the indicated location into the icon. The systems methods, and programs set, when a first icon and a second icon for performing operations related to a same
(Continued)

function are arranged side by side on the display, a first draw-in region including the first icon and a second draw-in region including the second icon such that the first draw-in region and the second draw-in region are present in a region between the first icon and the second icon and adjacent to each other.

4 Claims, 2 Drawing Sheets

(51) Int. Cl.
*G06K 9/00* (2006.01)
*G06F 3/0354* (2013.01)
*G06F 3/0482* (2013.01)
*G06F 3/0484* (2013.01)
*G06F 3/0485* (2013.01)
*B60K 37/06* (2006.01)
*B60K 35/00* (2006.01)

(52) U.S. Cl.
CPC ........ *G06F 3/03542* (2013.01); *G06F 3/0482* (2013.01); *G06F 3/0485* (2013.01); *G06F 3/04812* (2013.01); *G06F 3/04817* (2013.01); *G06F 3/04842* (2013.01); *G06K 9/00355* (2013.01); *B60K 2370/10* (2019.05); *B60K 2370/11* (2019.05); *B60K 2370/113* (2019.05); *B60K 2370/115* (2019.05); *B60K 2370/1442* (2019.05)

(56) References Cited

U.S. PATENT DOCUMENTS

| | | | |
|---|---|---|---|
| 2005/0195167 A1 | 9/2005 | Matsumoto et al. | |
| 2006/0256094 A1* | 11/2006 | Inagaki | G01C 21/3611 345/173 |
| 2009/0027421 A1* | 1/2009 | Servan-Schreiber | G06F 3/0481 345/661 |
| 2010/0100846 A1 | 4/2010 | Yoshida | |
| 2011/0109544 A1* | 5/2011 | Kitagawa | G01C 21/3664 345/157 |
| 2011/0160957 A1 | 6/2011 | Itoh et al. | |
| 2011/0261201 A1* | 10/2011 | Fujii | B60R 1/00 348/148 |

FOREIGN PATENT DOCUMENTS

| | | |
|---|---|---|
| JP | H09-265354 A | 10/1997 |
| JP | 2005-141674 A | 6/2005 |
| JP | 2005-141675 A | 6/2005 |
| JP | 2005-250983 A | 9/2005 |

OTHER PUBLICATIONS

Oct. 17, 2017 Supplementary Search Report issued in European Application No. 15873037.4.
Toyota USA: "2012 Camry Hybrid How-To: Headlamps Auto On/Off Toyota". YouTube. Jan. 17, 2012. URL: <https://www.youtube.com/watch?v=nT4VX92xHlk>. Retrieved Dec. 3, 2018.

* cited by examiner

DISPLAY CONTROL SYSTEM, METHOD, AND PROGRAM

TECHNICAL FIELD

Related technical fields include display control systems, methods, and programs.

BACKGROUND

Conventionally, there is known a configuration that displays a pointer and icons on a user interface screen, and selects the icons by operating the pointer using a pointing device. For example, JP 8-314637 A discloses a configuration in which in a configuration that displays selections and a cursor, a draw-in region is provided around each selection and the cursor in the draw-in region is drawn into a corresponding selection.

In addition, JP 9-265354 A and JP 2005-141675 A disclose a configuration in which a cursor is drawn into a button that is displayed at the closest location to the cursor.

SUMMARY

In the above-described conventional art, when the pointer is present in a draw-in region, the pointer is drawn into a corresponding icon, and thus, there is a case in which the pointer is drawn into a user's unintended icon. For example, a state is assumed in which a plurality of icons serving as options of a first function are displayed on a display and a plurality of icons serving as options of a second function are displayed on the display. In this state, even when a user selects a certain icon related to the first function and then moves the pointer attempting to select another icon related to the first function, if the pointer approaches an icon related to the second function and enters a draw-in region for the icon related to the second function, then the pointer is drawn into the icon related to the second function. Therefore, the pointer is drawn into an icon different from that intended by the user that is attempting to select an icon related to the first function.

Exemplary embodiments of the broad inventive principles described herein address the above-described problem, and provide a technique capable of reducing the probability of a pointer drawn into a user's unintended portion.

Exemplary embodiments provide systems, methods, and programs that obtain an indicated location indicated by a pointer, based on an output from a pointing device, and display, on a display, a user interface screen that displays icons at predetermined locations and displays the pointer indicating the indicated location. The systems methods, and programs draw, when the indicated location is present in a draw-in region including one of the icons, the indicated location into the icon. The systems methods, and programs set, when a first icon and a second icon for performing operations related to a same function are arranged side by side on the display, a first draw-in region including the first icon and a second draw-in region including the second icon such that the first draw-in region and the second draw-in region are present in a region between the first icon and the second icon and adjacent to each other.

In other words, in a case in which a first icon and a second icon for performing operations related to the same function are arranged side by side on a user interface screen, when a user has changed a location indicated by a pointer from a state in which the location indicated by the pointer is drawn into the first icon to a draw-in region for the second icon, the location indicated by the pointer is drawn into the second icon. Hence, in the process of the user attempting to select the first icon or the second icon to use a first function, the probability of the pointer drawn into another portion such as an icon of the other function is reduced. Accordingly, the probability of the pointer drawn into a user's unintended portion can be reduced.

DETAILED DESCRIPTION OF EXEMPLARY EMBODIMENTS

Here, an embodiment will be described in the following order:

(1) Configuration of an indication accepting system: and
(2) Other embodiments:

(1) Configuration of an Indication Accepting System

Figure 1:
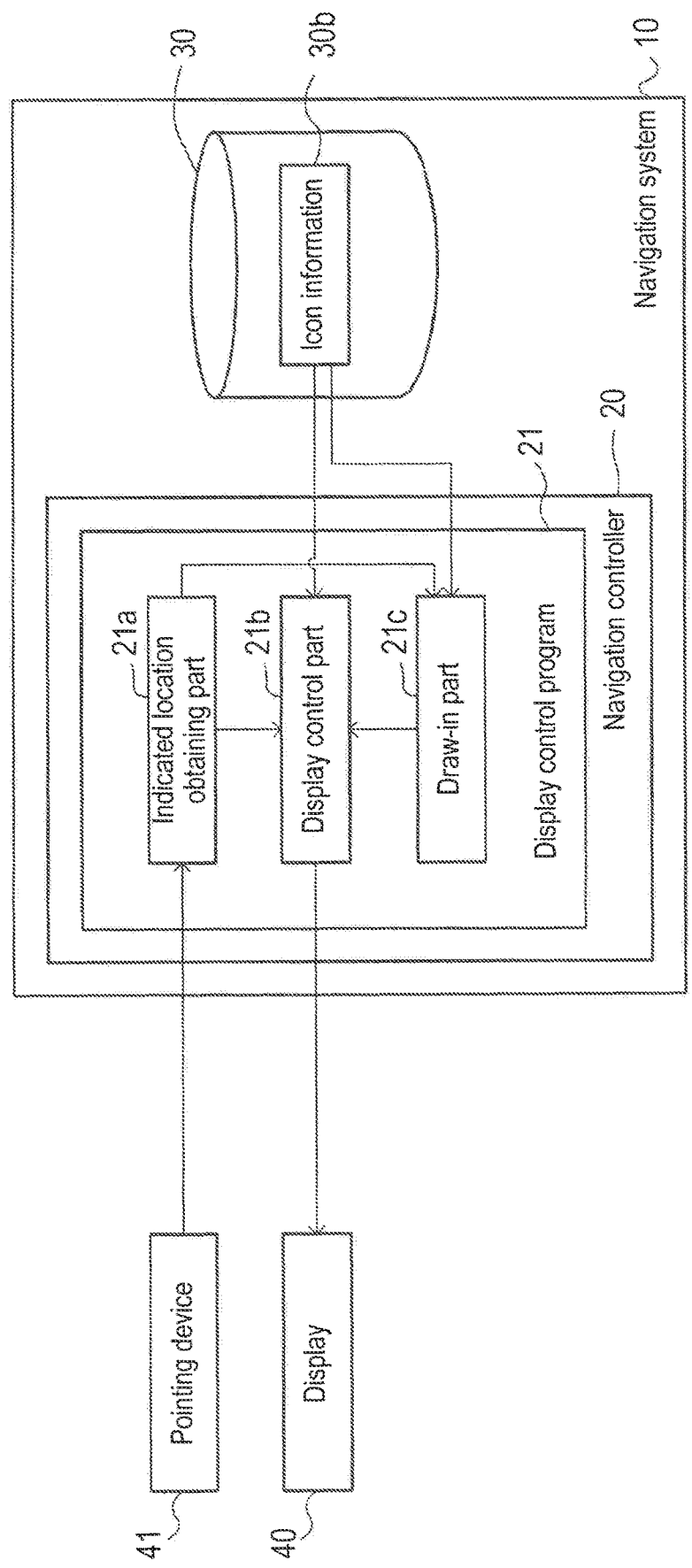
FIG. 1 is a block diagram showing an indication accepting system.

FIG. 1 is a block diagram showing a configuration of a navigation system 10 that implements an indication accepting system which is one embodiment. The indication accepting system according to the present embodiment is implemented as one function of the navigation system 10 mounted on a vehicle. The navigation system 10 includes a controller 20 including a CPU, a RAM, a ROM, etc., and the controller 20 can execute desired programs recorded in the ROM or a recording medium 30. (As used herein, the term "recording medium" is not intended to encompass transitory signals.) In the present embodiment, the controller 20 can execute a navigation program which is not shown. By the controller 20 executing the navigation program, the controller 20 directs the vehicle having the navigation system 10 mounted thereon to a specified destination, based on a GPS signal, etc., which are not shown. In addition, the navigation program can also allow the controller 20 to perform various types of processes, in addition to a process related to direction guidance.

Furthermore, in the present embodiment, the controller 20 can display a user interface screen for allowing a user to select various types of options, by a process of a display control program 21 which forms a part of the navigation program. For the options, various options can be assumed, but here a configuration will be described in which channels corresponding to broadcast stations that broadcast broadcast signals serve as options. In other words, in the present embodiment, the controller 20 can perform a process of receiving broadcast signals by a broadcast signal receiver which is not shown, decoding the broadcast signals of a plurality of channels, and outputting broadcast content from a display 40 and a speaker which is not shown.

The vehicle includes a pointing device 41 and a display 40 that can be used when performing input and output related to, for example, direction guidance or selection of an option. The display 40 is connected to the controller 20 through an interface which is not shown, and the controller 20 specifies arbitrary coordinates by outputting a control signal to the display 40, and can thereby display an arbitrary image on the display 40. In the present embodiment, the controller 20 displays, on the display 40, a user interface screen for using various types of functions. In the present embodiment, the user interface screen includes icons and a pointer for indicating the icons, etc.

The pointing device 41 includes a lever and is connected to the controller 20 through an interface which is not shown. When the user operates the lever of the pointing device 41, the pointing device 41 outputs a signal according to operation content of the lever. The controller 20 obtains the signal and identifies the user's operation content. In other words, the controller 20 obtains a location indicated by the pointer displayed on the user interface screen, based on an output from the pointing device 41, and changes the displayed location of the pointer indicating the indicated location, in accordance with changes in the indicated location. Hence, the user can move the pointer and perform input for selecting an icon on the user interface screen by operating the pointing device 41.

Note that in the present embodiment the pointing device 41 can output two types of output values corresponding to two coordinate axes, and can specify two-dimensional coordinates by the two types of output values. In addition, in the present embodiment, the pointing device 41 includes an actuator which is not shown, and thus the user that operates the pointing device 41 can perform operation recognizable by the sense of touch. In the present embodiment, when the controller 20 outputs a predetermined control signal to the pointing device 41, the pointing device 41 drives the actuator and gives the lever a force which is a reaction force to a force acted on the lever by the user.

In the present embodiment, the controller 20 displays, on the display 40, a user interface screen for allowing the user to select a channel. In order to facilitate selection of an option by the pointer, the controller 20 performs a draw-in process of drawing the indicated location into an icon. The draw-in process is a process in which when the indicated location is included a draw-in region including an icon (a region including an icon and a region around the icon), the indicated location is moved into the icon. In the present embodiment, when the controller 20 performs the draw-in process, the controller 20 outputs a control signal to the pointing device 41 to allow the above-described reaction force to act on the lever.

Figure 2A:
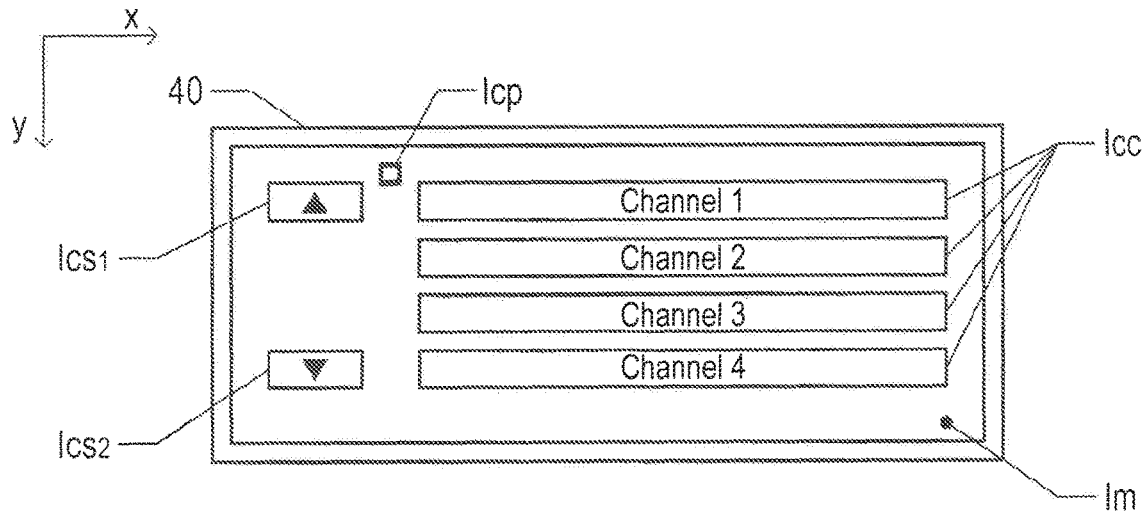
FIGS. 2A, 2B, and 2C are diagrams showing examples of a user interface screen.

FIG. 2A is a diagram showing an example of a user interface screen for allowing the user to select a channel. In this FIG. 2A, icons Icc representing channel options (channels 1 to 4) are displayed on the right side, and an icon $Ics_1$ that scrolls the options being displayed upward and an icon $Ics_2$ that scrolls the options being displayed downward are displayed on the left side. Note that reference sign Icp represents a pointer. In the present embodiment, when a location indicated by the pointer Icp is present in a draw-in region, the pointer Icp is drawn into a corresponding icon. Thus, when the location indicated by the pointer Icp approaches an arbitrary icon by an operation performed on the pointing device 41, the pointer Icp operates so as to be drawn into the icon.

In such a configuration, if the draw-in regions are set based on a uniform rule for each icon, e.g., a rule where a range of a predetermined distance from an icon serves as a draw-in region, then there is a case in which the pointer is drawn into a user's unintended icon. For example, when the user has performed a scroll operation using the icon $Ics_1$ to change the options displayed on the display 40, and then realizes that he/she has performed an excess operation and thus wants to scroll in an opposite direction, the user needs to move the pointer Icp downward. At this time, if the user has also moved the pointer Icp to the right instead of accurately moving the pointer downward on the pointing device 41, the pointer Icp is drawn into an icon Icc serving as an option. Such a user's unintended operation on the pointing device 41 frequently takes place in a vehicle where the user, in many cases, operates the pointing device 41 without directly looking at the pointing device 41.

Hence, to reduce the probability of the pointer Icp thus drawn into a user's unintended portion, the display control program 21 of the present embodiment includes an indicated location obtaining part 21a, a display control part 21b, and a draw-in part 21c. The indicated location obtaining part 21a is a program module that allows the controller 20 to implement a function of obtaining an indicated location which is indicated by the pointer Icp, based on an output from the pointing device 41. In the present embodiment, the controller 20 can identify an arbitrary location on the user interface screen, based on an output signal from the pointing device 41, and obtains the identified location as an indicated location. In the present embodiment, the pointer Icp is, as shown in FIG. 2A, a square frame and the center thereof is predefined as a location indicated by the pointer Icp.

The display control part 21b is a program module that allows the controller 20 to implement a function of displaying, on the display 40, a user interface screen that displays icons at predetermined locations and displays a pointer that indicates an indicated location. In other words, in the present embodiment, when a trigger to display channels of broadcast signals occurs by, for example, an operation performed on the pointing device 41 by the user, the controller 20 generates information for displaying a user interface screen for allowing the user to select a channel.

Specifically, information that indicates images of the icons Icc representing channel options, the icons $Ics_1$ and $Ics_2$ for scroll operations, and the pointer Icp is defined in advance as icon information 30b, and recorded in the recording medium 30. In addition, the channel options are registered in advance as presets in the recording medium 30, etc. Hence, the controller 20 obtains the preset channels as options and extracts a predetermined number of options from the channel options, and generates image information where channel names are superimposed on the icons Icc. In addition, the controller 20 generates image information for displaying the icons Icc side by side on the display 40 and displaying the icons $Ics_1$ and $Ics_2$ for scroll operations next to the icons Icc. Furthermore, the controller 20 adds information for displaying an image of a pointer indicating an indicated location which is obtained by a process of the indicated location obtaining part 21a, to the image information.

When the above-described image information is generated, the controller 20 outputs the image information to the display 40. As a result, the display 40 displays, based on the image information, a user interface screen for allowing the user to select a channel, such as that shown in FIG. 2A.

In the above-described configuration, the icons are classified into the icons Icc for implementing a function of selecting an option and the icons $Ics_1$ and $Ics_2$ for implementing a scroll function. In other words, in the present embodiment, icons for implementing two different types of functions are simultaneously displayed on a user interface screen for allowing the user to select a channel. Note that here, for the functions of the icons, various functions can be assumed in addition to the selection of an option and the scrolling on the user interface screen. Needless to say, when a function that is provided by an apparatus (e.g., an air conditioner) other than a user interface screen is performed by an icon, the function is considered a function of the icon.

In addition, in the example shown in FIG. 2A, the icons $Ics_1$ and $Ics_2$ are icons for implementing the same function. In other words, here, the icons $Ics_1$ and $Ics_2$ are used to achieve a common purpose of performing scrolling. The icons $Ics_1$ and $Ics_2$ are icons for selecting parameters so that results obtained when the above-described common purpose is achieved can differ from each other, and thus have the same function. Likewise, the icons Icc are icons for achieving a common purpose of selecting an option, and when the icons Icc are selected, options that are results of the selection differ from each other. Thus, the plurality of icons Icc are icons for implementing the same function.

The draw-in part 21c is a program module that allows the controller 20 to implement a function of drawing, when the indicated location is present in a draw-in region including an icon, the indicated location into the icon. In the present embodiment, a draw-in region is associated with each icon image and recorded in the recording medium 30. For the definition of the draw-in regions, various definitions can be adopted. For example, a configuration can be adopted that defines information for identifying a boundary of a draw-in region by relative coordinates from a reference location (the location of the center of gravity, a corner location, etc.) of an icon image (when the draw-in region is rectangular, relative coordinates from a corner, etc.).

At any rate, in the present embodiment, a draw-in region is set as a region wider than an icon. The controller 20 identifies a draw-in region for each icon on the user interface screen, based on the icon information 30b and determines whether an indicated location which is obtained by a process of the indicated location obtaining part 21a is in a draw-in region. Then, if the indicated location is in a draw-in region, the controller 20 obtains the location of the center of gravity of an icon associated with the draw-in region, as a new indicated location.

In this state, the controller 20 performs, by a process of the display control part 21b, a process of displaying a user interface screen on the display 40, by which a pointer is displayed on the display 40 with the indicated location drawn into the icon. Note that when the indicated location is drawn into an arbitrary icon, the display control part 21b of the controller 20 does not change the displayed location of the pointer until the indicated location moves out of the draw-in region. In other words, even after the indicated location has moved to the location of the center of gravity of the icon by drawing-in, the controller 20 detects a change in the indicated location by a process of the indicated location obtaining part 21a. Then, by a process of the display control part 21b, the controller 20 determines whether the indicated location has moved out of the draw-in region, based on a relationship between the location of the center of gravity of the icon and the draw-in region, and if the indicated location has moved out of the draw-in region, the controller 20 displays the pointer on the display 40 based on the indicated location.

In the present embodiment, in the above-described configuration, in order to reduce the probability of the pointer drawn into a user's unintended icon, in a case in which a first icon and a second icon for performing operations related to the same function are arranged side by side on the display 40, when the user has changed the indicated location from one of the first icon and the second icon in a direction that connects the first icon to the second icon, the controller 20 draws, by a process of the draw-in part 21c, the indicated location into one of the first icon and the second icon. In other words, in a case in which a plurality of icons for performing operations related to the same function are arranged side by side, when the indicated location has been changed in a direction that connects the icons, the controller 20 draws the indicated location into one of the icons.

Specifically, in the present embodiment, of the icons $Ics_1$ and $Ics_2$ for performing operations related to the same function, the former icon $Ics_1$ serves as the first icon and the latter icon $Ics_2$ serves as the second icon. In the present embodiment, a configuration is adopted in which by forming draw-in regions for the first icon $Ics_1$ and the second icon $Ics_2$ in a special shape (a shape obtained based on a rule different from that for the icons Icc), during an operation related to the scroll function, the indicated location is prevented from being drawn into an icon related to the other function.

Figure 2B:
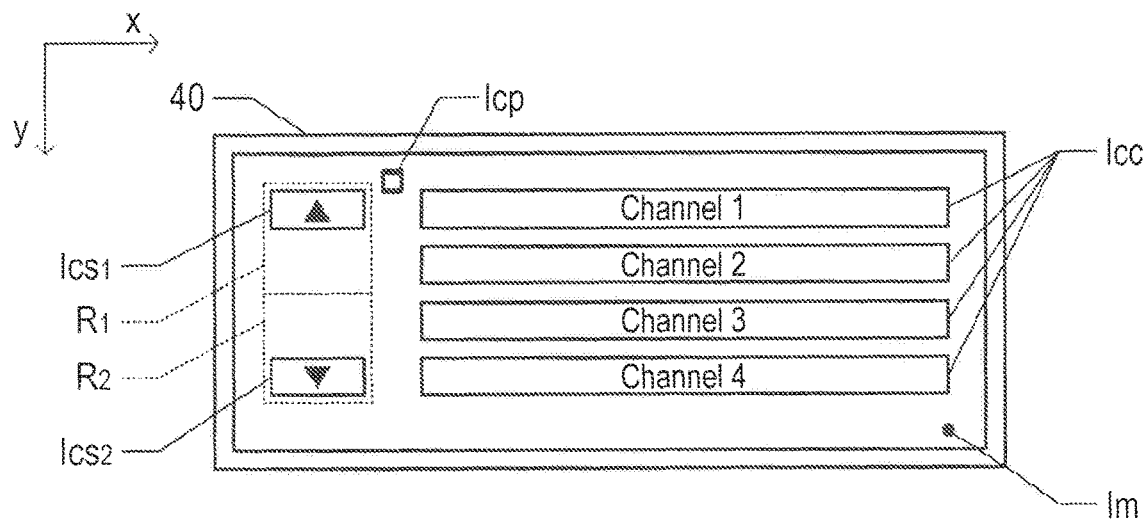

In other words, the icon information 30b defines that a first draw-in region including the first icon $Ics_1$ and a second draw-in region including the second icon $Ics_2$ are present in a region between the first icon $Ics_1$ and the second icon $Ics_2$ and adjacent to each other. Therefore, when the controller 20 obtains the first draw-in region including the first icon $Ics_1$ and the second draw-in region including the second icon $Ics_2$ by referring to the icon information 30b, the first draw-in region including the first icon $Ics_1$ and the second draw-in region including the second icon $Ics_2$ are set to be present in the region between the first icon $Ics_1$ and the second icon $Ics_2$ and to be adjacent to each other. FIG. 2B is a diagram clearly showing, by dotted-line rectangles, a first draw-in region $R_1$ including the first icon $Ics_1$ and a second draw-in region $R_2$ including the second icon $Ics_2$ in the example shown in FIG. 2A.

When the draw-in regions are set in the above-described manner, after the pointer Icp has been drawn into the first icon $Ics_1$ or the second icon $Ics_2$ and thereby moved to the location of the center of gravity of the icon, the indicated location is easily drawn into one of the first icon $Ics_1$ and the second icon $Ics_2$ that perform operations related to the same function.

Figure 2C:
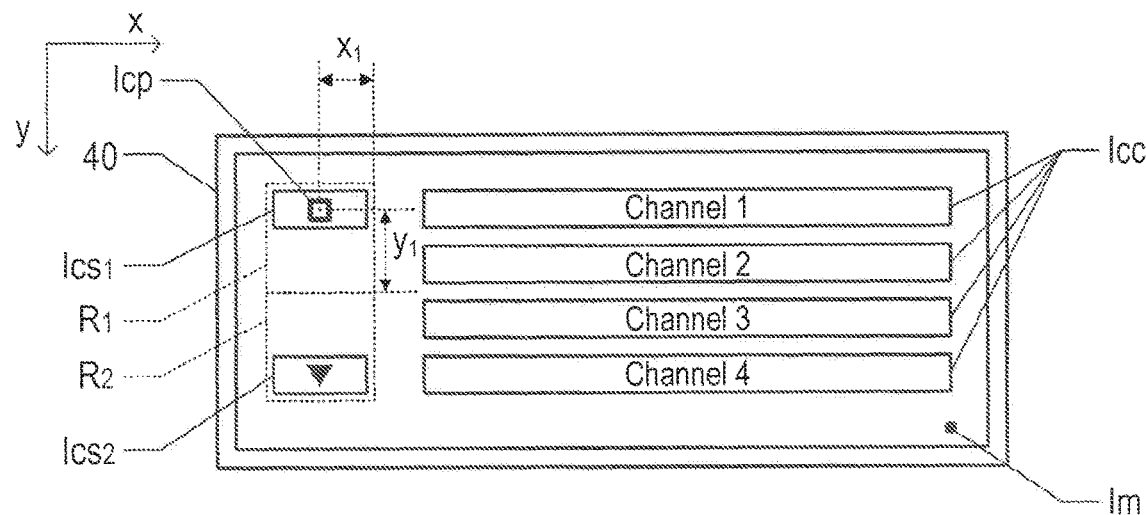

For example, a case in which, as shown in FIG. 2C, the pointer Icp is drawn into the first icon $Ics_1$ is assumed. In this case, the controller 20 determines whether the indicated location has moved out of the first draw-in region $R_1$, with the pointer Icp displayed at the location of the center of gravity of the first icon $Ics_1$. Then, when the pointer Icp has passed across a boundary between the first draw-in region $R_1$ and the second draw-in region $R_2$ and moved out of the first draw-in region $R_1$ by the user operating the pointing device 41, the location of the movement destination is in the second draw-in region $R_2$, and thus, the controller 20 draws the pointer Icp into the second icon $Ics_2$ associated with the second draw-in region $R_2$. On the other hand, when the pointer Icp has passed across a left or right boundary of the first draw-in region $R_1$ (a boundary perpendicular to an x-axis) and moved out of the first draw-in region $R_1$ by the user operating the pointing device 41, since the location of the movement destination is not in a draw-in region, the controller 20 displays the pointer Icp, with the location of the movement destination being the indicated location.

When the user selects the first icon $Ics_1$ and then moves the indicated location downward (a positive direction of a y-axis) using the pointing device 41 with the intention of selecting the second icon $Ics_2$ related to the same function as the first icon $Ics_1$, even if the user operates the pointing device 41 without visually identifying the pointing device 41, the main movement direction of the indicated location is downward. Therefore, even if the amount of operation is shifted somewhat in a left-right direction (x direction), if the amount of operation in the left-right direction is not large to the extent that the ratio between the amount of downward movement and the amount of movement in the left-right direction is smaller than $y_1/x_1$, then the movement destination for a case in which the indicated location has moved out of the first draw-in region $R_1$ is in the second draw-in region $R_2$.

Therefore, in the present embodiment, if the ratio between the amount of downward movement and the amount of movement in the left-right direction is in a state of being larger than $y_1/x_1$, the controller 20 considers it as a change made by the user to the indicated location from the first icon in the direction that connects the first icon to the second icon, and thus, draws the pointer Icp into the second icon $Ics_2$. Note that $y_1$ is, as shown in FIG. 2C, a distance from the location of the center of gravity of the first icon $Ics_1$ to a lower boundary of the first draw-in region $R_1$, and $x_1$ is, as shown in FIG. 2C, a distance from the location of the center of gravity of the first icon $Ics_1$ to a right-side boundary of the first draw-in region $R_1$.

As described above, in the present embodiment, as shown in FIG. 2A, in a case in which the first icon $Ics_1$ and the second icon $Ics_2$ are arranged side by side along the y-axis, when the user has changed the indicated location from one of the first icon $Ics_1$ and the second icon $Ics_2$ in the direction that connects the first icon $Ics_1$ to the second icon $Ics_2$, the indicated location is drawn into one of the first icon $Ics_1$ and the second icon $Ics_2$. According to this configuration, the user can very easily select the first icon $Ics_1$ and the second icon $Ics_2$ which serve as options for operations related to the same function. In addition, in the process of the user selecting one of the options related to the same function, the probability of the pointer Icp drawn into another portion such as an icon related to the other function can be reduced.

In addition, according to the above-described configuration, as long as the indicated location is present between the first icon $Ics_1$ and the second icon $Ics_2$, the indicated location is present inside the first draw-in region $R_1$ or inside the second draw-in region $R_2$, and thus, the pointer Icp is in a state of being drawn into one of the first icon $Ics_1$ and the second icon $Ics_2$. Accordingly, the probability of the pointer Icp drawn into a user's unintended portion can be reduced.

Furthermore, the boundary between the first draw-in region $R_1$ and the second draw-in region $R_2$ is present at the center between the location of the center of gravity of the first icon $Ics_1$ and the location of the center of gravity of the second icon $Ics_2$. Thus, to perform an operation of transitioning the indicated location between the first icon $Ics_1$ and the second icon $Ics_2$, the user does not need to move the indicated location from one icon to the other icon. Therefore, the pointer Icp is easily drawn into one of the icons related to the same function, and the probability of the pointer Icp drawn into an icon related to a different function can be reduced. Needless to say, in the above-described configuration, the shape and size of the first draw-in region $R_1$ and the second draw-in region $R_2$ may be variable. For example, when the pointer Icp is drawn into the first icon $Ics_1$, each draw-in region may be changed such that the boundary between the first draw-in region $R_1$ and the second draw-in region $R_2$ approaches the first icon $Ics_1$.

Note that in the above-described embodiment, as shown in FIG. 2A, between the first icon $Ics_1$ and the second icon $Ics_2$ there is no icon for performing an operation related to a function different from that of the icons. In such a case, if drawing-in of the indicated location present between the first icon $Ics_1$ and the second icon $Ics_2$ is not performed, then inconveniences may occur such as the amount of movement of the indicated location before drawing-in is performed is larger than that for other icons and the probability of the indicated location drawn into another icon increases. However, in the present embodiment, it is configured such that when the user has changed the indicated location from one of the first icon $Ics_1$ and the second icon $Ics_2$ in the direction that connects the first icon $Ics_1$ to the second icon $Ics_2$, the indicated location is drawn into one of the first icon $Ics_1$ and the second icon $Ics_2$. Therefore, the above-described inconveniences do not occur.

(2) Other Embodiments

The above-described embodiment is an example, and various other embodiments can also be adopted as long as the configuration is such that when the user has changed the indicated location from one of the first icon and the second icon in the direction that connects the first icon to the second icon, the indicated location is drawn into one of the first icon and the second icon. For example, means that forms the indication accepting system may be implemented by a single apparatus or may be present using two or more different apparatuses. For the latter, for example, a configuration in which the display control part 21b is implemented by a control unit that controls the display 40 can be adopted.

Furthermore, for the user interface screen, various screens can be assumed in addition to a screen where a channel is selected. For example, embodiments can include a screen related to a camera that shoots an area outside the vehicle, a screen related to a portable terminal, a wireless communication system, etc., a screen related to audio playback, or a screen related to direction guidance is displayed on the display. Needless to say, each controller may be installed at a location away from the display 40, and the configuration may be such that a part of the controller 20 is implemented by a server installed at a distant location. Needless to say, each controller may not be mounted on the vehicle.

Indicated location obtaining means may be any means that can obtain an indicated location which is indicated by a pointer, based on an output from the pointing device and may be any means configured to be able to identify an indicated location on a user interface screen from operation content which is indicated by an output from the pointing device. For the pointing device, various types of devices can be assumed, and the pointing device may be any device capable of performing input for selecting icons displayed on the user interface screen. Therefore, various types of devices such as a button, a joystick, a touchpad, and a contact sensor can be used as the pointing device.

The indicated location may be any location on the user interface screen that is indicated by the pointer. The indicated location may be directly obtained from an output from the pointing device or may be indirectly obtained. The latter includes, for example, an example in which the displayed location of the pointer which is substantially equivalent to the indicated location, or the like, is obtained from an output from the pointing device. More specifically, in a configuration in which the pointer has a predetermined shape and a pointer's indicating part is determined in the shape (e.g., a tip of an arrow pointer is an indicating part), in a configuration in which a displayed location of the pointer is obtained and the pointer is displayed such that a reference location of the pointer (the location of the center of gravity, a corner location, etc., of the pointer) matches the displayed location, obtaining the displayed location is substantially equivalent to obtaining the indicated location.

The pointer may be any object for indicating an arbitrary location on the user interface screen and may have any shape. For a mode of indicating an indicated location by the pointer, too, various modes are assumed, and the configuration may be such that an indicated location is clearly shown such as a tip of an arrow pointer, or the configuration may be such that the center of a figure such as a circle is an indicated location.

Display control means may be any means that can display, on the display, a user interface screen that displays icons at predetermined locations and displays a pointer that indicates an indicated location. In other words, a user interface screen is displayed on the display, and at least icons and a pointer are displayed on the user interface screen. Note that the icons are icons to be selected by the pointer and of any shape. On the user interface screen, the pointer is displayed so as to indicate an indicated location. In other words, the configuration may be any configuration in which the displayed location of the pointer on the user interface screen changes in conjunction with an operation performed on the pointing device.

In addition, the icons are icons for performing operations related to various types of functions that are implemented by a display control system or a controller that cooperates with the display control system. For such functions, at least one type of function is implemented, but it is preferable that there be two types of functions. In other words, in the case of the former, when the user is performing an operation related to a certain function, the pointer is drawn into an icon for operating the function, enabling to reduce the probability the pointer located in a user's unintended portion. In the case of the latter, when the user is performing an operation related to a certain function, the probability of the pointer drawn into an icon for performing an operation related to the other function can be reduced.

The function may be any function having a property that the function is operated by selection of an icon. For example, the function may be provided on a user interface screen or may be provided by other apparatuses (e.g., an air conditioner). The former includes, for example, a configuration in which two or more options displayed on the user interface screen are selected and the function is performed by selection of each option. An example of such a configuration includes, for example, a configuration in which a specific function such as scrolling is implemented by selecting symmetrical operations, such as an example in which an icon that indicates screen scroll forward and an icon that indicates screen scroll backward are displayed on the user interface screen. In addition, another example includes, for example, a configuration in which a specific function such as selection of a search result is implemented by selecting a specific option from a plurality of options, such as an example in which a plurality of options such as search results are displayed on the user interface screen.

The same function may be any function that is implemented by a display control system or a controller that cooperates with the display control system to achieve a common purpose (e.g., performing scrolling in the above-described example) and may be any function that can provide a plurality of parameters (options) in order that results obtained when the common purpose is achieved differ from each other (e.g., performing upward scrolling and downward scrolling in the above-described example).

Draw-in means may be any means that can draw, when the indicated location is present in a draw-in region including an icon, the indicated location into the icon. In other words, the draw-in means may be any means as long as a draw-in region is set to be a wider region than an icon, and even if the indicated location is outside the icon, if the indicated location is in the draw-in region, then the draw-in means can modify the indicated location which is indicated by the pointer on the user interface screen (therefore, the displayed location of the pointer) such that the pointer indicates the icon.

Furthermore, the draw-in means is configured to set, when a first icon and a second icon for performing operations related to the same function are arranged side by side on the display, a first draw-in region including the first icon and a second draw-in region including the second icon such that the first draw-in region and the second draw-in region are present in a region between the first icon and the second icon and adjacent to each other. In other words, the first draw-in region and the second draw-in region are set such that the first draw-in region and the second draw-in region are present so as to be extended to the region between the first icon and the second icon, and that a distance between the first draw-in region and the second draw-in region is 0 or very small. According to this configuration, the indicated location present between the first icon and the second icon is drawn into one of the first icon and the second icon. In addition, when the user has changed the location indicated by the pointer from a state in which the location indicated by the pointer is drawn into the first icon to the draw-in region for the second icon, the location indicated by the pointer is drawn into the second icon. Therefore, the probability of the pointer drawn into a user's unintended portion can be reduced.

Note that the draw-in means may be configured such that in a case in which the first icon and the second icon for performing operations related to the same function are arranged side by side on the display, when the user has changed the indicated location from one of the first icon and the second icon in a direction that connects the first icon to the second icon, the indicated location is drawn into one of the first icon and the second icon. In other words, the draw-in means is configured such that in a case in which a plurality of icons for performing operations related to the same function are arranged side by side, when the indicated location has been changed in a direction that connects the icons, the indicated location is drawn into one of the icons.

According to this configuration, the first icon and the second icon which serve as options for operations related to the same function can be very easily selected. In addition, in the process of the user selecting one of the options related to the same function, the probability of the pointer drawn into another portion such as an icon related to the other function can be reduced.

A state of the first icon and the second icon arranged side by side on the display includes a case in which the first icon and the second icon are adjacent to each other (a distance between the boundaries of the icons is 0 or very small) and a case in which the first icon and the second icon are not adjacent to each other (the boundaries of the icons are separated from each other). Note that if drawing-in is not performed in the case in which the first icon and the second icon are not adjacent to each other, then inconveniences are assumed such as the amount of movement of the indicated location is larger than that for the former and the probability of the indicated location drawn into another icon increases. Therefore, in the configuration in which the first icon and the second icon are not adjacent to each other, it is preferable to configure the draw-in means such that when the user has changed the indicated location from one of the first icon and the second icon in the direction that connects the first icon to the second icon, the draw-in means draws the indicated location into one of the first icon and the second icon, by which the above-described inconveniences are overcome.

The direction that connects the first icon to the second icon is a direction in which the indicated location can be considered to have been moved from one of the first icon and the second icon to the other. The direction includes, for example, a straight-line direction that connects the center of gravity of the first icon to the center of gravity of the second icon, and a direction in which an angle inclined to the straight-line direction is in a predetermined range. In addition, here, an estimation that the user has moved the indicated location from one of the first icon and the second icon to the other only needs to be made, and thus, various configurations can be adopted in addition to a configuration in which the movement direction of the indicated location is directly analyzed. For example, a configuration may be adopted in which when the indicated location is present in a region between the first icon and the second icon or when the indicated location has moved in a direction in which the indicated location approaches one of the first icon and the second icon in the region, the indicated location is considered to have been changed in the direction that connects the first icon to the second icon.

Furthermore, the draw-in means may be configured such that when between the first icon and the second icon there is no icon for performing an operation related to a function different from the same function, the indicated location is drawn into one of the first icon and the second icon. In other words, when between the first icon and the second icon there is no icon for performing an operation related to a function different from the same function, if drawing-in of the indicated location present between the first icon and the second icon is not performed, then inconveniences are assumed such as the amount of movement of the indicated location before drawing-in is performed is larger than that for other icons and the probability of the indicated location drawn into another icon increases. Therefore, in a configuration in which between the first icon and the second icon there is no icon for performing an operation related to a function different from the same function, it is preferable to configure the draw-in means such that when the user has changed the indicated location from one of the first icon and the second icon in the direction that connects the first icon to the second icon, the draw-in means draws the indicated location into one of the first icon and the second icon, by which the above-described inconveniences are overcome.

Furthermore, when the user has changed the indicated location from one of the first icon and the second icon in the direction that connects the first icon to the second icon, the technique in which the indicated location is drawn into one of the first icon and the second icon is applicable can be embodied in a program or a method. In addition, a case in which a system, a program, and a method such as those described above are implemented as a single apparatus or a case in which a system, a program, and a method such as those described above are implemented by a plurality of apparatuses can be assumed, and thus, a system, a program, and a method such as those described above include various modes. For example, a navigation system, a method, or a program that includes means such as those described above can be provided. In addition, changes can be made as appropriate, e.g., some of the means are software and some of the means are hardware. Furthermore, the systems and/or methods described above can also be implemented as a recording medium for a program that controls the system. Needless to say, the recording medium for software may be a magnetic recording medium or may be a magneto-optical recording medium, and any recording medium to be developed in the future can also be considered in exact the same way.

The invention claimed is:

1. A display control system comprising:
a processor programmed to:
obtain an indicated location based on an output from a pointing device;
display, on the display, a user interface screen that displays icons at predetermined locations and displays a pointer indicating the indicated location;
set, when a first icon and a second icon for performing operations related to a same function are arranged side by side on the display, a first draw-in region including the first icon and a second draw-in region including the second icon such that the first draw-in region and the second draw-in region are present in a region between the first icon and the second icon and adjacent to each other;
display, on the display, an additional icon for performing a function that is different from the function of the first icon and the second icon;
set the first draw-in region and the second draw-in region according to rules that are different from the rules for the additional icon;
whenever the indicated location is present in the first draw-in region, draw the pointer within the first icon; and
whenever the indicated location is present in the second draw-in region, draw the pointer within the second icon.

2. The display control system according to claim 1, wherein the processor is programmed to draw the indicated location into one of the first icon and the second icon when the additional icon is not present between the first icon and the second icon.

3. A display control method comprising:
obtaining an indicated location based on an output from a pointing device;
displaying, on the display, a user interface screen that displays icons at predetermined locations and displays a pointer indicating the indicated location;
when a first icon and a second icon for performing operations related to a same function are arranged side by side on the display, setting a first draw-in region including the first icon and a second draw-in region including the second icon such that the first draw-in region and the second draw-in region are present in a region between the first icon and the second icon and adjacent to each other;
displaying, on the display, an additional icon for performing a function that is different from the function of the first icon and the second icon;
setting the first draw-in region and the second draw-in region according to rules that are different from the rules for the additional icon;
whenever the indicated location is present in the first draw-in region, drawing the pointer within the first icon; and
whenever the indicated location is present in the second draw-in region, drawing the pointer within the second icon.

4. A computer-readable recording medium storing a computer-executable display control program that causes a computer to implement the following functions:
obtaining an indicated location based on an output from a pointing device;

displaying, on the display, a user interface screen that displays icons at predetermined locations and displays a pointer indicating the indicated location;

when a first icon and a second icon for performing operations related to a same function are arranged side by side on the display, setting a first draw-in region including the first icon and a second draw-in region including the second icon such that the first draw-in region and the second draw-in region are present in a region between the first icon and the second icon and adjacent to each other;

displaying, on the display, an additional icon for performing a function that is different from the function of the first icon and the second icon;

setting the first draw-in region and the second draw-in region according to rules that are different from the rules for the additional icon;

whenever the indicated location is present in the first draw-in region, drawing the pointer within the first icon; and whenever the indicated location is present in the second draw-in region, drawing the pointer within the second icon.

\* \* \* \* \*